United States Patent [19]

Sato

[11] Patent Number: 4,719,528
[45] Date of Patent: Jan. 12, 1988

[54] GUIDE DRUM

[75] Inventor: Fumiaki Sato, Yokohama, Japan

[73] Assignee: Victor Company of Japan, Ltd., Japan

[21] Appl. No.: 810,869

[22] Filed: Dec. 17, 1985

[30] Foreign Application Priority Data

Dec. 24, 1984 [JP] Japan .......................... 59-195676[U]

[51] Int. Cl.⁴ ........................................... G11B 15/60
[52] U.S. Cl. ............................................... 360/130.24
[58] Field of Search ..................................... 360/130.24

[56] References Cited

U.S. PATENT DOCUMENTS 3,930,270 12/1975 Tanigawa ...................... 360/130.24
4,395,745 7/1983 Aarts ........................... 360/130.24 X

FOREIGN PATENT DOCUMENTS 2337989 3/1974 Fed. Rep. of
                Germany ...................... 360/130.24
52-28306 3/1977 Japan ............................. 360/130.24
60-175241 9/1985 Japan ............................. 360/130.24

Primary Examiner—A. J. Heinz
Attorney, Agent, or Firm—Andrus, Sceales, Starke & Sawall

[57] ABSTRACT

A guide drum comprises a stationary drum having a tape guide for guiding a magnetic tape along a predetermined tape path and a rotary drum rotatably provided with respect to the stationary drum. The rotary drum has at least one magnetic head for recording and/or reproducing a signal on and/or from the magnetic tape which is wrapped spirally around an outer peripheral surface of the guide drum over a predetermined angular range. The guide drum comprises first and second tapered parts which are formed with reference to a reference position having a specific height from a lower edge of the rotary drum. A diameter of an outer peripheral surface of the first tapered part gradually decreases toward the stationary drum, and a diameter of an outer peripheral surface of the second tapered part gradually decreases in a direction away from the stationary drum.

12 Claims, 14 Drawing Figures

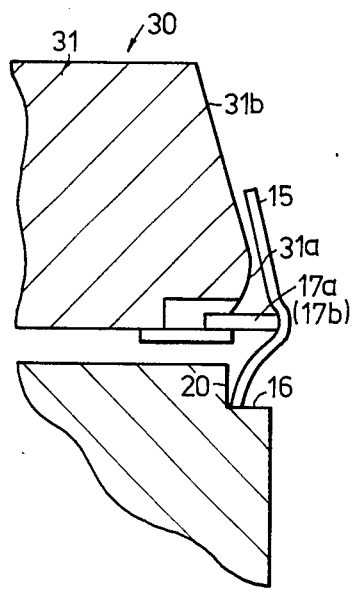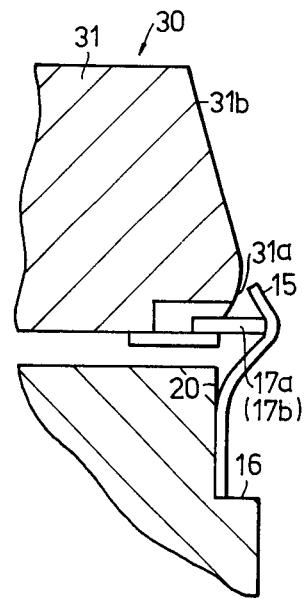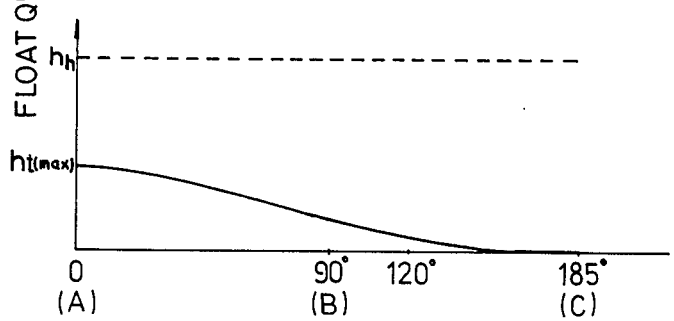

GUIDE DRUM

BACKGROUND OF THE INVENTION

The present invention generally relates to guide drums which comprise a stationary drum and a rotary drum and are for use in so-called helical scan type magnetic recording and/or reproducing apparatuses which record and/or reproduce a signal on and/or from a magnetic tape, and more particularly to a guide drum which is designed so that the magnetic tape can move smoothly and a satisfactory recording and/or reproduction can be carried out.

Generally, when recording or reproducing a signal on or from a magnetic tape in a helical scan type magnetic recording and/or reproducing apparatus (hereinafter simply referred to as a video tape recorder or VTR), the tape is moved in a state where the tape is wrapped spirally around an outer peripheral surface of a guide drum over a predetermined angular range. The guide drum comprises a substantially cylindrical stationary drum and a substantially cylindrical rotary drum. The stationary drum is provided with a tape guide for guiding the tape along a predetermined tape path. The rotary drum is provided with one or a plurality of magnetic heads which project slightly from an outer peripheral surface of the rotary drum. At an entrance part of the guide drum in a tape moving direction, a large portion of the tape along a width direction thereof is in contact with the outer peripheral surface of the rotary drum. On the other hand, at an exit part of the guide drum in the tape moving direction, a large portion of the tape along the width direction thereof is in contact with an outer peripheral surface of the stationary drum. The rotary drum rotates at a high speed of 1800 rpm, for example, and the head scans obliquely to a longitudinal direction of the tape so as to record or reproduce the signal on or from the tape.

Because the rotary drum rotates at the high speed, an air flow is generated in a vicinity of the outer peripheral surface of the guide drum and an air film is formed by this air flow between the guide drum and the tape. A thickness of the air film is not uniform throughout the entire angular range over which the tape is wrapped around the outer peripheral surface of the guide drum. The thickness of the air film is largest at the entrance part of the guide drum along the tape moving direction and gradually decreases toward the exit part of the guide drum, since a large area of the tape opposes the outer peripheral surface of the rotary drum at the entrance part of the guide drum and only a small area of the tape opposes the exit part of the guide drum. Due to the formation of such a non-uniform air film, the contact between the head and the tape becomes unstable, and problems such as a shew in a reproduced picture occurs because lengths of tracks formed on the tape become inconsistent.

Hence, in a conventional VTR, a diameter of the outer peripheral surface of the rotary drum opposing the tape is set greater than a diameter of an outer peripheral surface of the stationary drum opposing the tape. As a result, the head makes positive contact with the tape. However, at the exit part of the guide drum along the tape moving direction, the tape makes contact with the outer peripheral surface of the rotary drum and the tape is easily damaged. In addition, particles of magnetic material scraped off from a recording surface of the tape due to the contact between the tape and the outer peripheral surface of the rotary drum adhere to the tape and the head, and there is a problem in that a signal dropout may occur as a consequence. Further, an unstable rotation of the rotary drum due to vibration and eccentricity of the rotary drum is directly transmitted to the tape and causes problems such a wow and flutter and jitter.

When the tape makes contact with the outer peripheral surface of the rotary drum at the exit part of the guide drum along the tape moving direction or when the thickness of the air film is not uniform from the entrance part toward the exit part of the guide drum, a linearity of tracks formed on the tape becomes poor. Moreover, a load on a drum motor which drives the rotary drum increases when the tape makes contact with the outer peripheral surface of the rotary drum, and there is a problem in that a power consumption becomes large. On the other hand, depending on a projecting quantity of the head from the outer peripheral surface of the rotary drum, a hitting phenomenon occurs. In the present specification, the hitting phenomenon refers to a phenomenon in which the head hits the recording surface of the tape and separates from the tape at the exit part of the guide drum. This hitting phenomenon is especially notable when a distance between the recording surface of the tape and the outer peripheral surface of the rotary drum at the exit part of the guide drum is small compared to the projecting quantity of the head from the outer peripheral surface of the rotary drum. When the hitting phenomenon occurs, the recording surface of the tape is hit by the head and is easily damaged, and a vibration easily occurs when the head hits the tape.

It is possible to eliminate the hitting phenomenon by reducing the projecting quantity of the head from the outer peripheral surface of the rotary drum. However, in this case, there is a problem in that it no longer becomes possible to maintain positive contact between the head and the tape at the entrance part of the guide drum along the tape moving direction.

On the other hand, recently, metal tapes and metal evaporated thin film tapes such as metal alloy thin film tapes are also used on VTRs. However, these kinds of tapes are more rigid compared to the normal tape, and it is extremely difficult to stably maintain a desired contact pressure of the head with respect to the tape by use of the conventional guide drum. For this reason, it is impossible to carry out a satisfactory recording or reproduction by bringing out the fine performance of the tape.

Accordingly, in order to eliminate the problems described heretofore, a guide drum having a tapered part was previously proposed in a Japanese Laid-Open Utility Model Application No. 58-148757 which was laid open on Oct. 6, 1983. The previously proposed guide drum comprises a rotary drum and a stationary drum, wherein the rotary drum is provided with the tapered part at a lowermost part thereof. An outer diameter of the tapered part decreases toward the stationary drum. According to this previously proposed guide drum, the tape does not make contact with the rotary drum at the exit part of the guide drum along the tape moving direction due to the provision of the tapered part, and the hitting phenomenon does not occur. However, the proposed guide drum does not consider controlling the thickness of the air film at the entrance part of the guide drum along the tape moving direction. As a result, a difference between the thickness of the air film at the entrance part and the thickness of the air film at the exit part becomes large. Consequently, the tape tension becomes unstable and the tape movement also becomes unstable. Moreover, since the contact pressure of the head with respect to the tape becomes unstable, it becomes impossible to carry out a satisfactory recording or reproduction.

SUMMARY OF THE INVENTION

Accordingly, it is a general object of the present invention to provide a novel and useful guide drum in which the problems described heretofore are eliminated.

Another and more specific object of the present invention is to provide a guide drum which comprises a stationary drum having a tape guide for guiding a magnetic tape along a predetermined tape path and a rotary drum rotatably provided with respect to the stationary drum. The rotary drum has at least one magnetic head for recording and/or reproducing a signal on and/or from the magnetic tape which is wrapped spirally around an outer peripheral surface of the guide drum over a predetermined angular range. The guide drum according to the present invention comprises first and second tapered parts which are formed with reference to a reference position having a specific height from a lower edge of the rotary drum. A diameter of an outer peripheral surface of the first tapered part gradually decreases toward the stationary drum, and a diameter of an outer peripheral surface of the second tapered part gradually decreases in a direction away from the stationary drum. According to the guide drum of the present invention, it is possible to control the thickness of an air film formed between the magnetic tape and the guide drum, and it is possible to prevent unwanted contact between the magnetic tape and an outer peripheral surface of the rotary drum and prevent the hitting phenomenon described before. As a result, it is possible to carry out satisfactory recording and/or reproduction.

Still another object of the present invention is to provide a guide drum which further comprises a skirt part at a lower end of the rotary drum. The first tapered part includes the skirt part of the rotary drum. According to the guide drum of the present invention, it is easy to adjust a gap between the rotary drum and the stationary drum and the mounting of the rotary drum with respect to the stationary drum is facilitated. For this reason, the gap between the rotary drum and the stationary drum can be made extremely small.

Other objects and further features of the present invention will be apparent from the following detailed description when read in conjunction with the accompanying drawings.

BRIEF DESCRIPTION OF THE DRAWINGS

FIG. 1 is a plan view showing an example of a conventional guide drum together with guide poles and the like;

FIGS. 9A and 9B are cross sectional views in part on an enlarged scale respectively showing the relationship between the guide drum shown in FIG. 7 and the magnetic tape at the entrance part and the exit part of the guide drum along the tape moving direction;

FIG. 10 shows the relationship between the floating quantity of the magnetic tape and a projecting quantity of a magnetic head;

DETAILED DESCRIPTION

Figure 1:
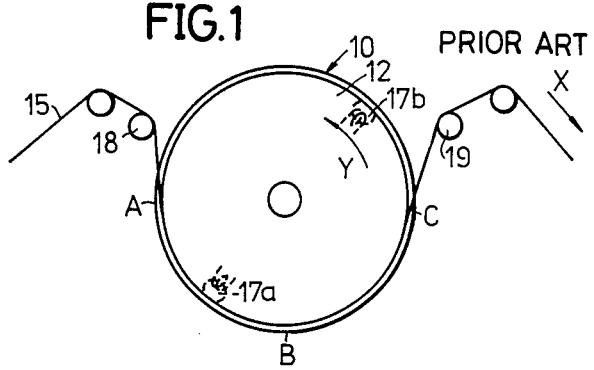
Figure 2:
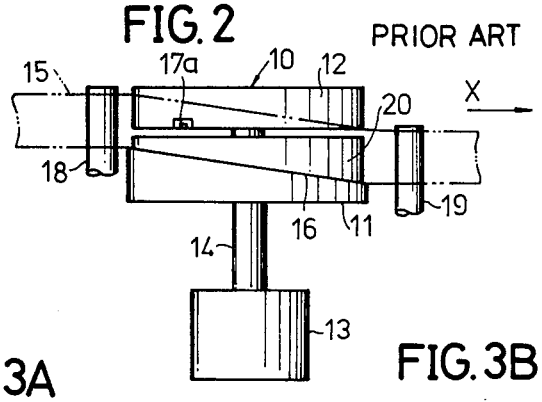
FIG. 2 is a side view of the conventional guide drum shown in FIG. 1.

First, description will be given with respect to an example of the conventional guide drum comprising a substantially cylindrical stationary drum and a substantially cylindrical rotary drum. As shown in FIGS. 1 and 2, a guide drum 10 comprises a stationary drum 11 and a rotary drum 12. A rotary shaft 14 of a drum motor 13 pentrates through a center hole in the stationary drum 11 and a tip end of the rotary shaft 14 is fixed to the rotary drum 12. A tape guide 16 for guiding a magnetic tape 15 along a predetermined tape path is provided on the stationary drum 12. Magnetic heads 17a and 17b are provided on the rotary drum 12 and project from an outer peripheral surface of the rotary drum 12 by a certain projecting quantity. The tape 15 is guided by a pair of guide poles 18 and 19 and is wrapped spirally around an outer peripheral surface of the guide drum 10 over a predetermined angular range. In this state, a lower edge of the tape 15 is guided along the predetermined tape path by the tape guide 16 of the stationary drum 11. The tape 5 makes contact with a sliding contact surface 20 of the stationary drum 11. A diameter of the outer peripheral surface of the rotary drum 12 is slightly greater than a diameter of the stationary drum 11 at the sliding contact surface 20.

Figure 3A:
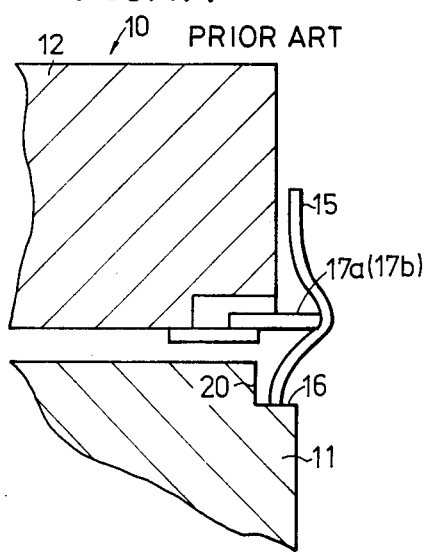
FIGS. 3A and 3B are cross sectional views in part on an enlarged scale respectively showing the relationship between the conventional guide drum and a magnetic tape at an entrance part and an exit part of the guide drum along a tape moving direction.
Figure 3B:
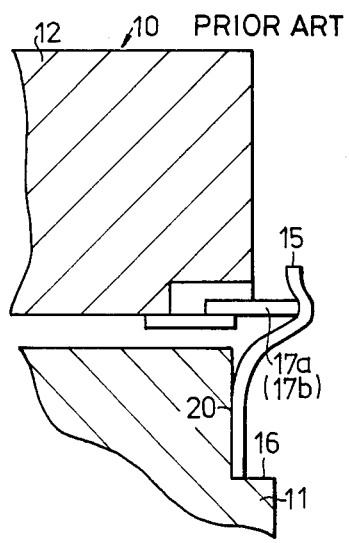

When the rotary drum 12 is driven by the motor 13 and is rotated in a direction Y at a high speed of 1800 rpm, for example, an air flow is generated in a vicinity of the outer peripheral surface of the guide drum 10. An air film is formed between the guide drum 10 and the tape 15 by this air flow. An area of the tape 15 opposing the rotary drum 12 is large at an entrance part A of the guide drum 10 along a tape moving direction X, but the area decreases from an intermediate part B toward an exit part C. For this reason, a thickness of the air film is not uniform throughout the entire angular range over which the tape 15 is wrapped around the outer peripheral surface of the guide drum 10, and the thickness of the air film is a maximum at the entrance part A but gradually decreases from the intermediate part B toward the exit part C. FIG. 3A shows the relationship btween the guide drum 10 and the tape 16 at the entrance part A, and FIG. 3B shows the relationship between the guide drum 10 and the tape 15 at the exit part C. In FIGS. 3A and 3B and FIGS. 5, 6, 9A, 9B, and 12 which will be described later, a thickness of the tape 15 and the like are illustrated exaggeratedly for convenience's sake.

Figure 4:
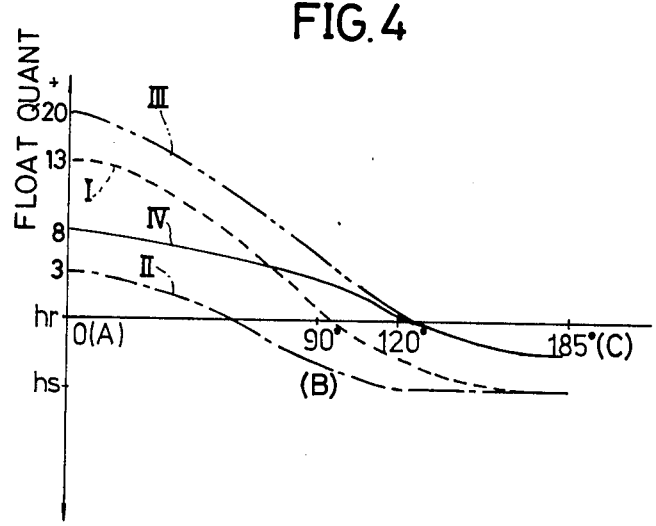
FIG. 4 shows a floating quantity of the magnetic tape from an outer peripheral surface of a rotary drum with respect to an angular range over which the magnetic tape is wrapped around the outer peripheral surface of the guide drum.

A phantom line I in FIG. 4 shows a floating quantity of the tape 15 from the outer peripheral surface of the rotary drum 12 of the conventional guide drum 10 with respect to the angular range over which the tape 15 is wrapped around the outer peripheral surface of the guide drum 10. As is clear from the curve I, the floating quantity gradually decreases from the entrance part A toward the exit part C. The floating quantity is a negative value at the exit part C, and this indicates that the tape 15 is in contact with the sliding contact surface 20 which has a diameter smaller than the diameter of the outer peripheral surface of the rotary drum 12. In FIG. 4, $h_r$ represents the outer peripheral surface (maximum outer diameter part) of the rotary drum 12 and $h_s$ represents the outer peripheral surface (sliding contact surface 20) of the stationary drum 11.

According to the conventional guide drum 10, the thickness of the air film which is formed is not uniform and the contact between the head 17a (17b) and the tape 15 becomes unstable. As a result, problems such as a skew in a reproduced picture occurs because lengths of tracks formed on the tape 15 become inconsistent. In addition, the tape tension becomes unstable and the tape movement also becomes unstable. It is possible to increase the projecting quantity of the head 17a from the outer peripheral surface of the rotary drum 12 so that the head 17a positively makes contact with the tape 15, however, in this case, the hitting phenomenon described before becomes notable and problems such as damage of the tape 15 and the head 17a and vibration of the tape 15 occur. On the other hand, when the projecting quantity of the head 17a is too small, the tape 15 makes contact with the outer peripheral surface of the rotary drum 12 at the exit part C and an unwanted load is applied to the motor 13. Thus, as shown in FIG. 3B, the projecting quantity of the head 17a is normally set so that the tape 15 does not make contact with the outer peripheral surface of the rotary drum 12 at the exit part C, but as a result, the hitting phenomenon cannot be prevented.

Figure 5:
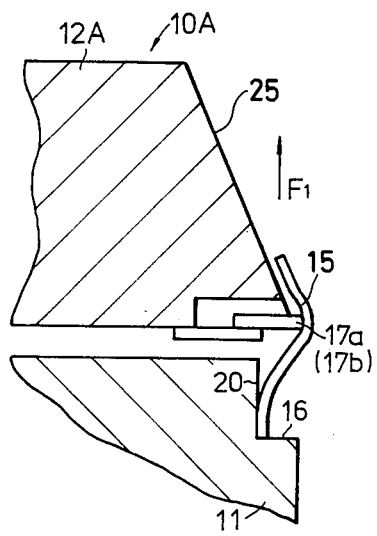
FIGS. 5 and 6 are cross sectional views in part on an enlarged scale respectively showing the relationships between tested guide drums and the magnetic tape at an intermediate part of the guide drum along the tape moving direction.
Figure 6:
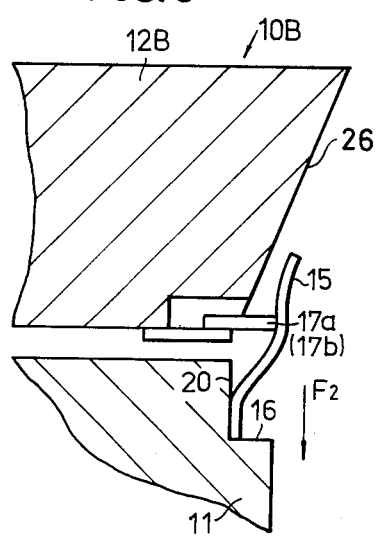

Accordingly, the present inventor tested rotary drums 12A and 12B having a tapered part as shown in FIGS. 5 and 6, respectively, and obtained the floating quantity of the tape 15 for guide drums 10A and 10B. In FIGS. 5 and 6, those parts which are the same as those corresponding parts in FIGS. 3A and 3B are designated by the same reference numerals, and description thereof will be omitted. FIGS. 5 and 6 respectively show the relationship between the tape 15 and the guide drums 10A and 10B at the intermediate part B.

In FIG. 5, the rotary drum 12A has a tapered part 25 and a diameter of an outer peripheral surface of the tapered part 25 gradually decreases in a direction away from the stationary drum 11. A one-dot chain line II in FIG. 4 shows the floating quantity of the tape 15 for the guide drum 10A. As is clear from FIG. 4, the floating quantity of the tape 15 is small and the tape 15 makes contact with an outer peripheral surface of the rotary drum 12A over a large angular range. As a result, an unwanted load is applied to the drum motor and the power consumption increases. The tape 15 and the head 17a (17b) are easily damaged. In addition, an upper end part of the tape 15 tends to curve toward the rotary drum 12A, but due to the rotation of the rotary drum 12A, a force acts on the tape 15 in a direction F1 and the tape 15 easily separates from the tape guide 16. Hence, the tape movement becomes unstable and the linearity of the tracks formed on the tape 15 becomes poor.

In FIG. 6, the rotary drum 12B has a tapered part 26 and a diameter of an outer peripheral surface of the tapered part 26 gradually decreases toward the stationary drum 11. A two-dot chain line III in FIG. 4 shows the floating quantity of the tape 15 for the guide drum 10B. As is clear from FIG. 4, the floating quantity of the tape 15 is large compared to that of the guide drum 10A shown in FIG. 5, and the tape 15 does not make contact with an outer peripheral surface of the rotary drum 12B in a range from the intermediate part B to the exit part C. However, the floating quantity of the tape 15 is too large at the entrance part A and the contact between the head 17a (17b) and the tape 15 is extremely unstable. Further, an upper end part of the tape 15 tends to curve in a direction away from the rotary drum 12B, but due to the rotation of the rotary drum 12B, a force acts on the tape 15 in a direction F2 and the lower edge of the tape 15 is excessively pushed against the tape guide 16. As a result, the tape movement becomes unstable and the linearity of the tracks formed on the tape 15 becomes poor.

Figure 7:
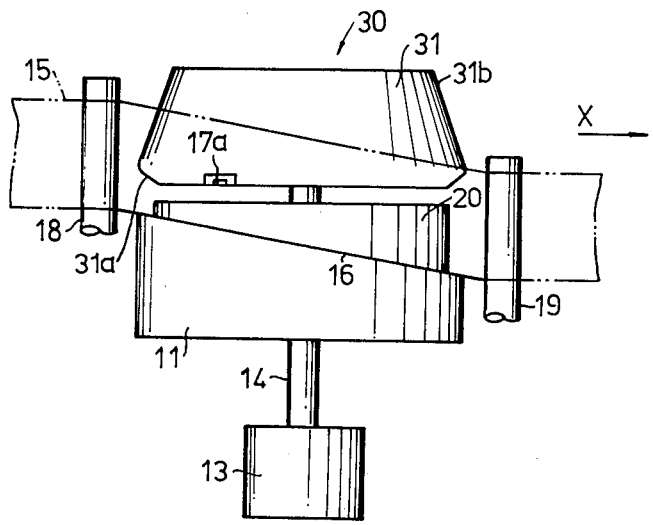
FIG. 7 is a side view showing an embodiment of the guide drum according to the present invention.

Accordingly, the problems described heretofore are eliminated in the present invention by employing a rotary drum having a shape shown in FIG. 7 by use of the results obtained from the two tested guide drums 10A and 10B. FIG. 7 shows an embodiment of the guide drum according to the present invention, and in FIG. 7, those parts which are the same as those corresponding parts in FIG. 2 are designated by the same reference numerals, and description thereof will be omitted.

Figure 8:
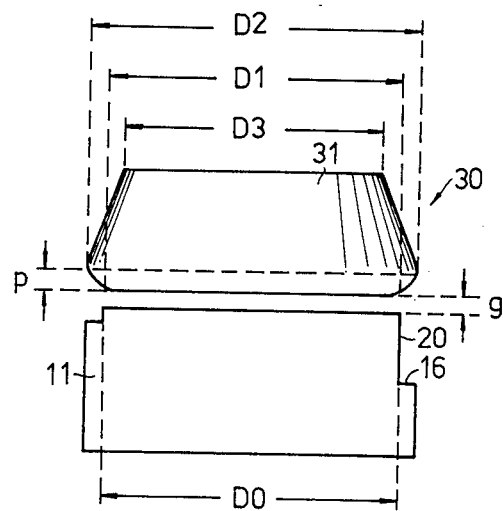
FIG. 8 shows dimensions of the guide drum shown in FIG. 7.

As shown in FIG. 8, a rotary drum 31 of a guide drum 30 has tapered parts 31a and 31b with reference to a reference position having a specific height P from a lower edge of the rotary drum 31. A diameter of an outer peripheral surface of the tapered part 31a gradually decreases toward the satisfactory drum 11, and a diameter of an outer peripheral surface of the tapered part 31b gradually decreases in a direction away from the stationary drum 11. In other words, the diameter of the outer peripheral surface of the rotary drum 31 is a maximum at the reference position. In the present embodiment, the outer peripheral surface of the rotary drum 31 in a vicinity of the reference position is rounded so that the rotary drum 31 will not damage the tape 15 even upon contact therewith. When it is assumed that a height of the rotary drum 31 is 13.5 mm, for example, the specific height P is in a range of 2 mm to 5 mm. In this case, when it is assumed that the diameter of the outer peripheral surface of the substantially cylindrical rotary drum 12 shown in FIG. 2 is 62 mm+7 $\mu$m, a diameter D0 of the outer peripheral surface of the stationary drum 11 at the sliding contact surface 20 is 2 $\mu$m to 3 $\mu$m smaller than 62 mm. In addition, an outer diameter D1 at a lowermost end of the rotary drum 31 is greater than or equal to D0, a maximum outer diameter D2 at the reference position is 5 $\mu$m to 10 $\mu$m larger than D1, and an outer diameter D3 at an uppermost end of the rotary drum 31 is 5 $\mu$m to 10 $\mu$m smaller than D1. A gap g between an upper edge of the stationary drum 11 a lower edge of the rotary drum is 0.4 mm, for example.

According to the guide drum 30 having the construction described above, the relationship between the guide drum 30 and the tape 15 at the entrance part A becomes as shown in FIG. 9A. At the entrance part A, a large part of the tape 15 in the width direction thereof opposes the rotary drum 31. Hence, although the tape 15 tends to deviate in a direction so as to separate from the rotary drum 31 due to the air flow, the tape 15 curves toward the tapered part 31b due to the prevention of the tapered part 31b. However, the tape 15 will not make contact with the tapered part 31b because of the existence of the air flow, and the small thickness of the air film is maintained.

On the other hand, the relationship between the guide drum 10 and the tape 15 at the exit part C becomes as shown in FIG. 9B. At the exit part C, a large part of the tape 15 in the width direction thereof opposes the stationary drum 11. Thus, a large part of the tape 15 makes contact with the sliding contact surface 20 of the stationary drum 11. However, the upper end of the tape 15 will not make contact with the outer peripheral surface of the rotary drum 31 due to the air flow and the provision of the tapered part 31a. In addition, even when the projecting quantity of the head 17a (17b) is made smaller than that of the conventional guide drum, the tape 15 will not make contact with the outer peripheral surface of the rotary drum 31 because of the existence of the tapered part 31a and it is possible to cause the head 17a to make contact with the tape 15 without introducing the hitting phenomenon.

A solid line IV in FIG. 4 shows the relationship between the floating quantity of the tape 15 from the outer peripheral surface of the rotary drum 31 with respect to the angular range over which the tape 15 is wrapped around the outer peripheral surface of the guide drum 30. As is clear from the curve IV, the floating quantity of the tape 15 at the entrance part A is controlled to an optimum value which is not too large. Further, at the exit part C, the floating quantity of the tape 15 is approximately zero (that is, the tape 15 essentially makes contact with a maximum diameter part of the outer peripheral surface of the rotary drum 31) and the tape 15 will not be pushed excessively against the stationary drum 11. Accordingly, the tape tension becomes approximately constant and problems such as skew in the reproduced picture will not occur because the head 17a (17b) makes stable contact with the tape 15 with an optimum contact pressure. Therefore, compared to the case where the conventional guide drum 10 described before is used, it is possible to carry out satisfactory recording and/or reproduction by use of the guide drum 30.

In addition, the tape 15 does not make contact with the rotary drum 31 even at the exit part C. As a result, an unwanted load will not be applied to the drum motor and the power consumption will not increase. Moreover, it is possible to suppress the hitting phenomenon and hence prevent the vibration of the tape 15 and damage of the tape 15 and the head 17a (17b). Consequently, the generation of wow and flutter and jitter is effectively prevented.

In the present embodiment, the tape 15 is wrapped spirally around the outer peripheral surface of the guide drum 30 over an angular range of approximately 185°. But the angular range over which the tape 15 is wrapped around the outer peripheral surface of the guide drum 30 is not limited to 185° and may be greater than or less than 185°. For example, the angular range may be 270°. Further, the number of heads is not limited to two, and one head or three or more heads may be employed.

In FIG. 9B, the tape 15 does not make contasct with the rotary drum 31. However, when D1 is greater than D0, the tape 15 may make slight contasct with the rotary drum 31. Accordingly, it is desirable that D1=D0. In addition, the tape 15 is more likely to make contact with the rotary drum 31 when an extremely thin tape is used as the tape 15, and in such a case, the gap g between the lower edge of the rotary drum 31 and the upper edge of the stationary drum 11 should be set to a small value. The smaller the gap g is, a more desirable result is obtained. The relationship between the floating quantity of the tape 15 and the projecting quantity of the head 17a (17b) is shown in FIG. 10 for the case where the gap g is approximately zero. In FIG. 10, a zero floating quantity indicates that the floating quantity of the tape 15 from the sliding contact surface 20 (D0=D1) is zero. Further, a phantom line indicates the position of the head 17a. A projecting quantity $h_h$ of the head 17a from the surface having the outer diameter D1 is 35 μm, for example, which is reduced by approximately 10 μm compared to the projecting quantity of the head of the conventional guide drum 10. A maximum floating quantity $h_{t(max)}$ of the tape 15 is 10 μm, for example.

Figure 11:
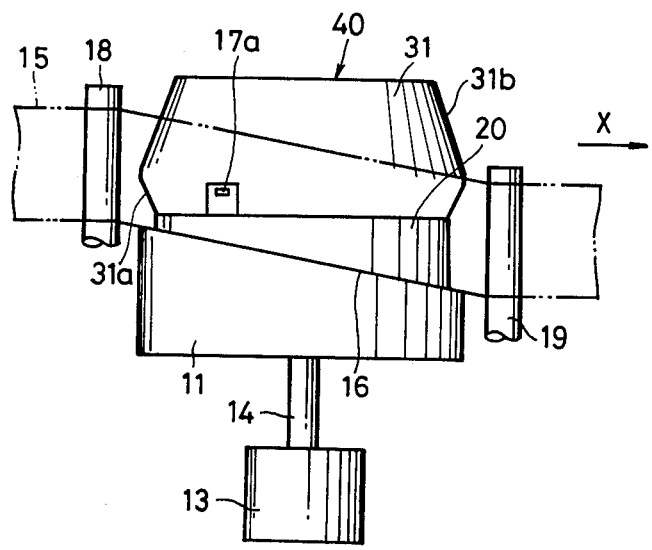
FIG. 11 is a side view showing another embodiment of the guide drum according to the present invention.
Figure 12:
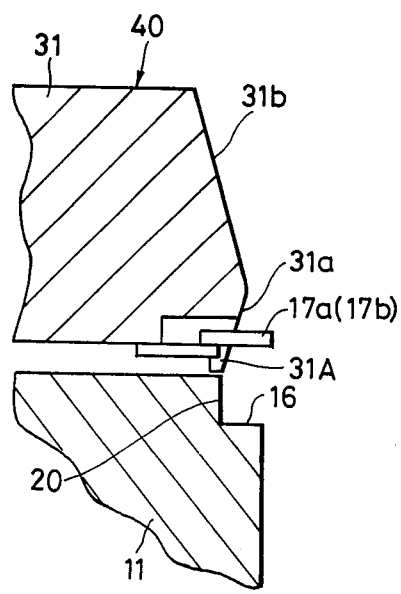
FIG. 12 is a cross sectional view in part on an enlarged scale showing the guide drum shown in FIG. 11.

FIGS. 11 and 12 respectively show another embodiment of the guide drum according to the present invention. In FIGS. 11 and 12, those parts which are the same as those corresponding parts in FIGS. 7, 9A, and 9B are designated by the same reference numerals, and description thereof will be omitted.

In the present embodiment, the rotary drum 31 of a guide drum 41 comprises a skirt part 31A. The skirt part 31A is provided at a lower end of the rotary drum 31 and forms a part of the tapered part 31a. According to the present embodiment, the gap between the rotary drum 31 and the stationary drum 11 is extemely small at the outer peripheral surface of the guide drum 40. For this reason, even in a case where an extremely thin tape is used, it is possible to effectively prevent the tape from making contact with the rotary drum especially at the exit part C.

The present embodiment is advantageous in that it is easy to adjust the gap between the rotary drum and the stationary drum and the mounting of the rotary drum with respect to the stationary drum is facilitated, because only the lower end of the skirt pad 31A needs to be adjusted in order to adjust the gap and not the entire bottom surface of the rotary drum 31. For this reason, the gap between the rotary drum and the stationary drum can be made extremely small with ease.

Further, the present invention is not limited to these embodiments, but various variations and modifications may be made without departing from the scope of the present invention.

What is claimed is:

1. A guide drum comprising at least one magnetic head for recording and/or reproducing a signal on and-/or from a magnetic tape, said magnetic tape travelling in a spirally wrapped path having ends around an outer peripheral surface of the guide drum over a predetermined circumferential range which has an entrance part at one end and an exit part at the other end thereof, said guide drum comprising:

a stationary drum having a tape guide for guiding the magnetic tape along a predetermined tape path; and a rotary drum provided rotatable with respect to said stationary drum, said magnetic head being provided on said rotary drum and projecting from an outer peripheral surface of said rotary drum by a predetermined projecting quantity, said rotary drum having a first tapered part which is formed below a reference position having a specific height from a lower edge of said rotary drum and a second tapered part which is formed above said reference position, said first tapered part having an outer peripheral surface with a diameter which gradually decreases toward said stationary drum, said second tapered part having an outer peripheral surface with a diameter which gradually decreases in a direction away from said stationary drum, said magnetic tape opposing said first and second tapered parts of said rotary drum at said entrance part of said guide drum and opposing substantially said first tapered part of said rotary drum and said stationary drum at said exit part of said guide drum.

2. A guide drum as claimed in claim 1 in which the outer peripheral surface of said rotary drum is rounded in a vicinity of said reference position.

3. A guide drum as claimed in claim 1 in which maximum diameters of the outer peripheral surfaces of said first and second tapered parts coincide, and a minimum diameter of the outer peripheral surface of said first tapered part is greater than a minimum diameter of the outer peripheral surface of said second tapered part.

4. A guide drum as claimed in claim 3 in which said stationary drum has a sliding contact surface which makes contact with the magnetic tape, and an outer diameter of said sliding contact surface is equal to or smaller than the minimum diameter of the outer peripheral surface of said first tapered part.

5. A guide drum as claimed in claim 4 in which the outer diameter of said sliding contact surface is approximately 62 mm and is approximately equal to the minimum diameter of the outer peripheral surface of said first tapered part, said rotary drum has a height of approximately 13.5 mm, the minimum diameter of the outer peripheral surface of said second tapered part is 5 $\mu$m to 10 $\mu$m smaller than the minimum diameter of the outer peripheral surface of said first tapered part, and the maximum diameters of said first and second tapered parts are 5 $\mu$m to 10 $\mu$m greater than the minimum diameter of the outer peripheral surface of said first tapered part.

6. A guide drum as claimed in claim 5 in which said magnetic head projects from the outer peripheral surface of said first tapered part at the minimum diameter by a distance of approximately 35 $\mu$m.

7. A guide drum as claimed in claim 5 in which said specific height is in a range of 2 mm to 5 mm.

8. A guide drum as claimed in claim 1 which further comprises a drum motor for rotating said rotary drum, said magnetic tape being out of contact with the outer peripheral surface of said rotary drum while said rotary drum is rotated at a high speed by said drum motor.

9. A guide drum as claimed in claim 8 in which said high speed is approximately 1800 rpm.

10. A guide drum as claimed in claim 1 in which said rotary drum has a skirt part provided on a lower end thereof, said skirt part forming a part of said first tapered part.

11. A guide drum as claimed in claim 1 in which said predetermined circumferential range is approximately 185°.

12. A guide drum as claimed in claim 1 in which a gap between the lower edge of the rotary drum and an upper edge of said stationary drum is approximately 0.4 mm or less at the outer peripheral surface of said guide drum.

* * * * *